A. G. DAMM.
APPARATUS FOR PRODUCING SERIES OF SIGNS.
APPLICATION FILED JULY 21, 1915.
1,233,035.
Patented July 10, 1917.
5 SHEETS—SHEET 3.
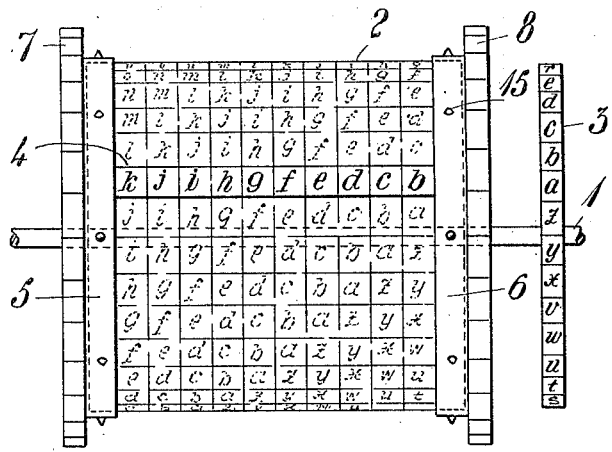
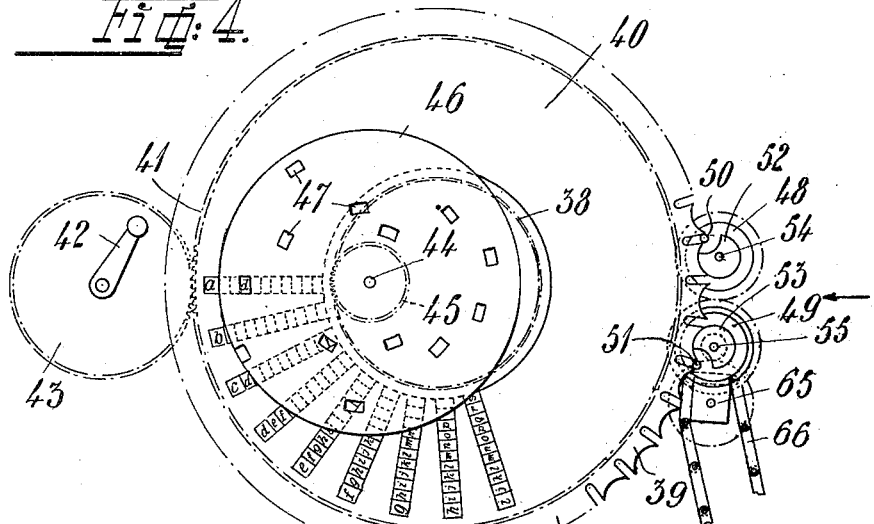
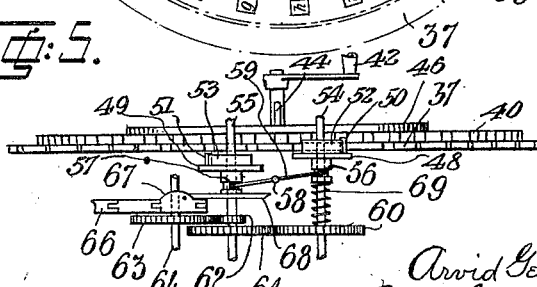
Inventor
Arvid Gerhard Damm,
By
Atty

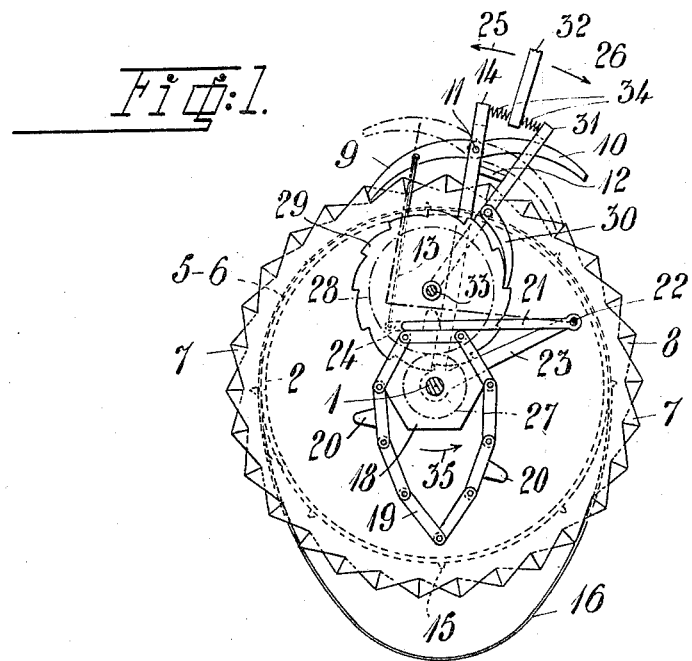
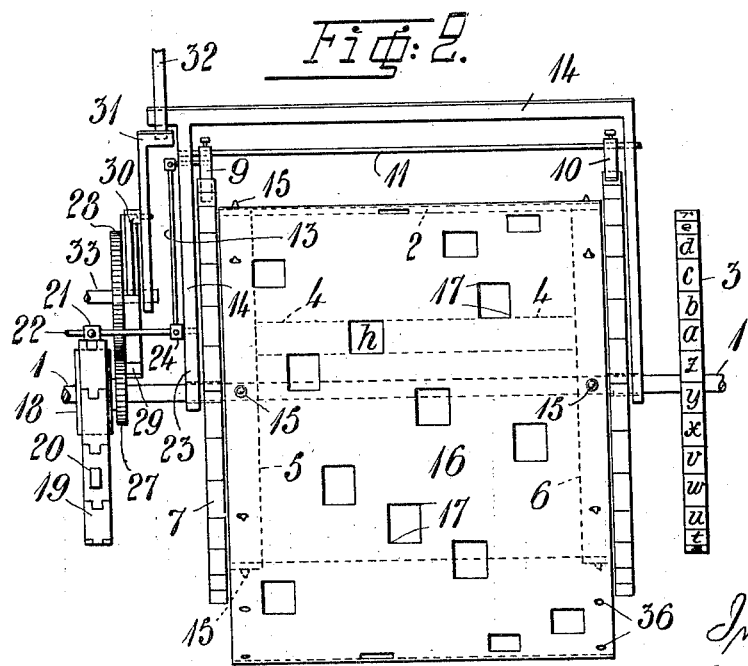

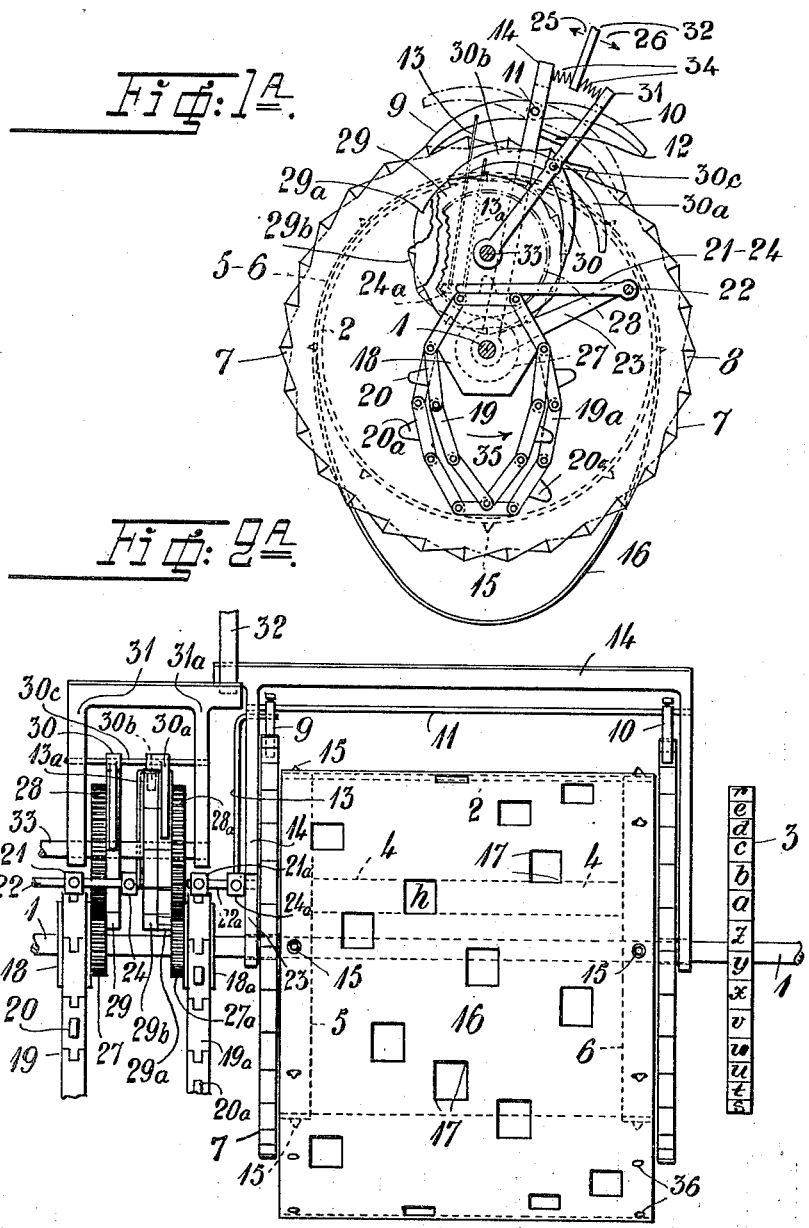

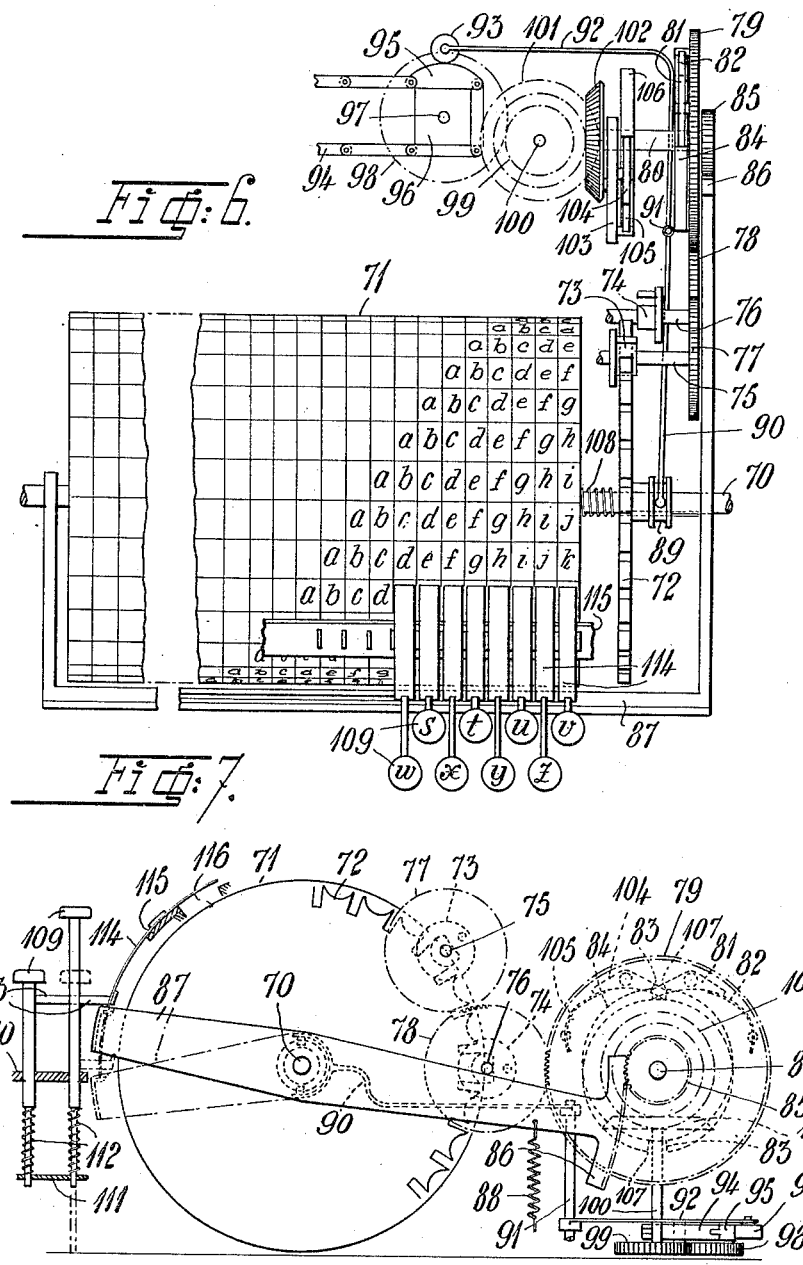

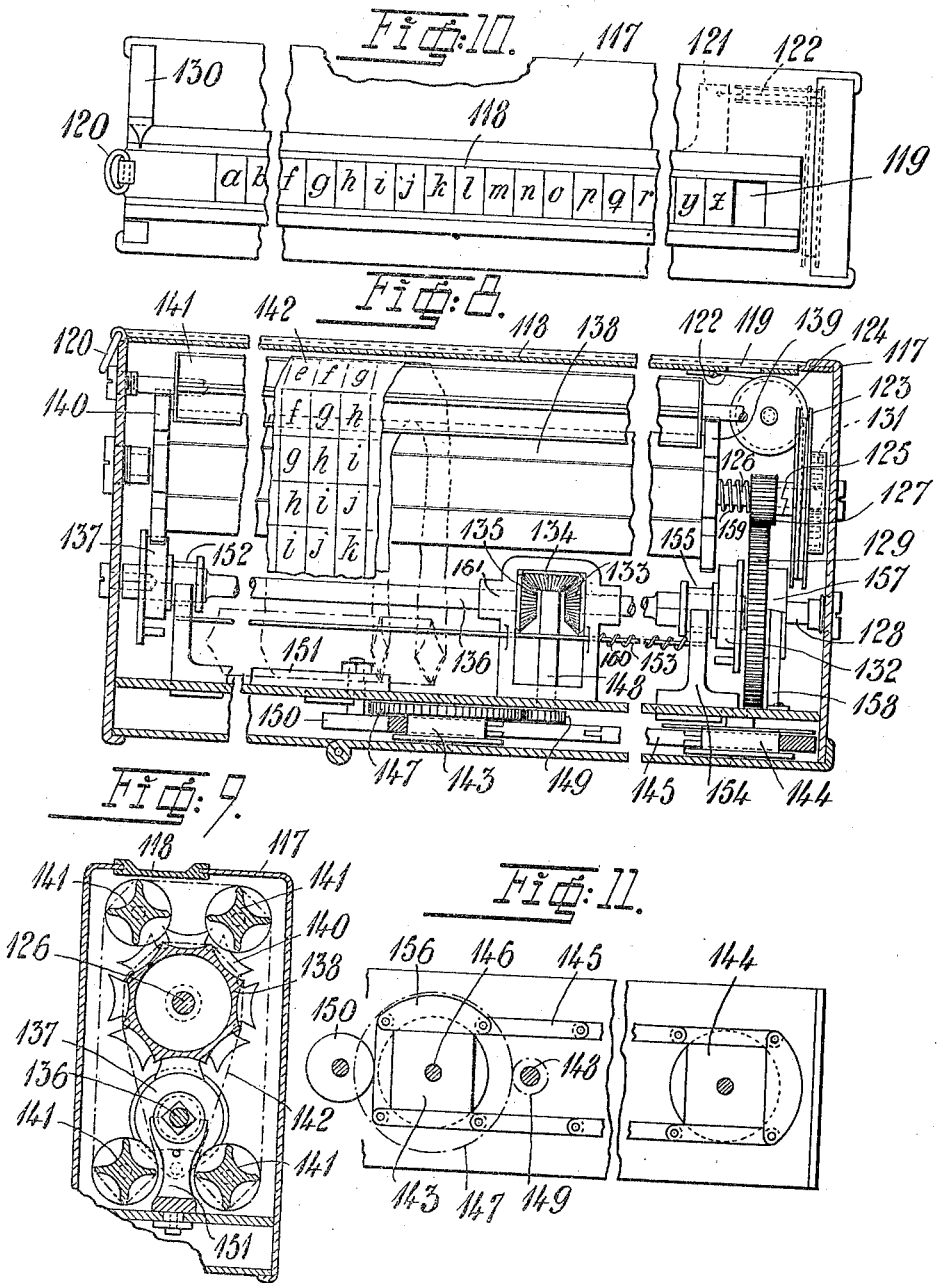

UNITED STATES PATENT OFFICE.

ARVID GERHARD DAMM, OF STOCKHOLM, SWEDEN.

APPARATUS FOR PRODUCING SERIES OF SIGNS.

1,233,035.

Specification of Letters Patent. Patented July 10, 1917.

Application filed July 21, 1915. Serial No. 41,105.

*To all whom it may concern:*

Be it known that I, ARVID GERHARD DAMM, a citizen of the Kingdom of Sweden, residing at Stockholm, Sweden, have invented new and useful Improvements in Apparatus for Producing Series of Signs, the individual signs of which are arbitrarily disposed as compared to their positions within a standard series, of which the following is a specification.

The object of the present invention is to produce series of signs, the real meaning of which will be protected from being found out by an unrightful scrutinizer, even in the case of his having an unlimited number of such series of signs at his disposal. The principle of the invention resides in that the substitution of the signs of a certain series (for inst. a certain text) by other signs is effectuated by means of two or more mutation series (commonly called "keys"), these series coöperating and being arbitrarily chosen and one of these is possibly identical with the original series of signs (text).

In the accompanying drawings I have shown some embodiments of my invention. The apparatus or devices shown are specially designed to produce ciphers. Some of the figures are diagrammatic in so far as certain non-essential details have been omitted, for instance covers, bearings and so on, certain details being moreover, in order to make the figures clearer, shown in positions slightly different from their real ones. Figures 1–3 show one constructional form in end view, front elevation and in detail respectively. Figs. 1ᴬ and 2ᴬ show in end view and front elevation, a modification of the device shown in Figs. 1 and 2. Fig. 4 shows another constructional form seen from above, and Fig. 5 the same in side elevation viewed in the direction of the arrow in Fig. 4. Figs. 6 and 7 show a third constructional form seen from above and from one end. Fig. 8 shows a fourth form of construction in a side view, where certain details are broken and omitted. Fig. 9 shows a section, Fig. 10 a view from above and Fig. 11 from underneath some of the details of this last-mentioned form.

Referring to Figs. 1–3; 2 indicates a cylinder and 3 a disk, both rigidly secured to a main axle 1. The circumference of the disk is divided in rectangular fields or squares, the number of which is arbitrary and which are marked with the letters of an alphabet in the ordinary or any other conventional order. The curved surface of the cylinder 2 is, by lines parallel to its axle, divided into the same number of fields as the circumference of disk 3. These longitudinal fields are subdivided into an arbitrary number of squares by means of circles (in the present instance in 10, the curved surface of the drum or cylinder thus containing 10 times as many fields as the circumference of disk 3.) Each square of the cylinder 2 is marked with a sign corresponding to one of the signs on disk 3. Within each longitudinal row of squares these signs, if counted from disk 3, follow in the same order as do the signs on disk 3, when counted around its circumference in one and the same direction. Moreover the signs in any longitudinal row of squares on the drum advance one step as compared with the signs in an adjacent row, and consequently diagonal rows of fields, each row showing one and the same sign, will be formed on the drum, as is shown in Fig. 3. Instead of letters, any signs, figures or types, differently shaped and sized holes, etc., may occupy the fields or squares of cylinder and disk. Around both ends of the cylinder 2 loose rings 5, 6, which may be turned independently of the drum, are disposed, each ring immovably fixed to a ratchet wheel 7 and 8 respectively. By means of some simple arrangement, not shown in the drawings, these ratchet wheels and rings are rigidly united so as to form a movable whole, comprising parts 5, 6, 7, 8. Each ratchet wheel has the same number of teeth as the circumference of the disk 3 has fields or squares, the teeth of the wheels being turned in opposite directions (Fig. 1). Each ratchet wheel may be operated by a ratchet 9 or 10 respectively which, being fixed on a common axle 11, are adjusted so as never to come simultaneously into gear with both wheels, in whatever way the axle 11 be turned. The bearing of the axle being arranged on a part 14, which may be made to swing about the main axle 1, the one or the other of the ratchets 9 and 10 may be made to turn its ratchet wheel in one direction. The turning of axle 11, in order to put either ratchet 9 or 10 into gear, is effectuated by means of a link 13, attached by a pin stud to one of the ratchets, for instance 9, the link 13 being also connected with a lever 24. This lever is fixed on an axle 22, the bearing of which is arranged on an arm 23 joined to the part 14, already mentioned.

The axle 22 carries another lever 21, influenced by a link chain 19 driven by a prism 18. This prism is loose on the shaft 1 and is fixed to a toothed wheel 27 likewise loose on the shaft 1 and in gear with another such wheel 28, the latter one fixed to a ratchet wheel 29. This ratchet wheel is driven by a ratchet 30 carried by a lever 31 which may be made to swing about an axle 33 carrying also both wheels 28 and 29. Consequently the prism 18 may be turned by moving the lever 31 forward and backward in such an angle as will permit the ratchet 30 each time to catch a new tooth of the ratchet wheel 29. The levers 14 and 31 may be attached for instance by means of springs 34 to one and the same part 32, which part is movable in directions indicated by arrows 25 and 26, (Fig. 1), either by hand or by means of an eccentric, crank or some similar contrivance, and may be guided in any suitable manner by the casing (not shown) of the apparatus. Between both levers 14 and 31 a stop-part 12 is immovably placed, in order to limit the swinging motion of each lever in one direction. Said stop-part may be secured to the casing of the apparatus.

This arrangement serves to prevent the parts 5, 6, 7, and 8 mentioned before and the chain 19 from changing their positions simultaneously. Some links of this chain carry protruding knobs 20, which, following the movement of the chain, will come in contact with and lift the lever 21, thus turning the axle 22. This will cause the lever 24 to move the ratchets 9 and 10 by means of the link 13, changing their positions from those shown in Fig. 1 by full lines, to those shown by dotted lines, thus putting the ratchet 9 out of and the ratchet 10 in gear with its wheel. If a link with a knob 20 is carried away from under the lever 21, when the prism 18 turns up a new link of the chain, and is followed by a flat link without a knob, the parts 21, 13, 24, will, on account of their own weight, move into the position shown in Fig. 1 by full lines, and a new change will take place in the positions of ratchets 9 and 10. Thus, the part 32 being swung in both directions 25 and 26 sufficiently far, the chain 19 will be driven always in the same direction the length of one link, the ratchet wheels 7 and 8 being also driven one tooth in the one or other direction, according as the one or the other of the ratchets 9 and 10 is in gear with its wheel.

Around the cylinder 2 an endless flexible band or sheet 16 is led. A series of holes 36 near each border of the band enables the rings 5 and 6 to keep it in position by means of studs 15, fixed on the rings and entering into the holes. The band moreover has a series of rectangular openings 17, (Fig. 2), in size and form corresponding exactly to the fields of the cylinder. The studs 15 and openings 17 are arranged relatively to one another and to the fields of the drum so that one field of the drum in any longitudinal row will always be visible through any one of the openings 17 when the band is conducted over the drum. In other respects the openings 17 may be arbitrarily disposed.

By means of the apparatus described above an original series of signs can be changed in the following manner. The disk 3, which may be placed outside the casing of the apparatus and the drum 2 are turned till that of the signs of the disk 3 which corresponds to the first sign of the original series comes into alinement with the field of observation (marked by the rectangular space 4 in Figs. 2 and 3), which may in reality be an aperture in the cover of the apparatus. Then the part 32 is moved once forward and backward, causing the band 16 to be transported one step in the one or the other direction relatively to the drum, so that one of the openings 17 uncovers one sign on the drum within the field of observation. This sign is then substituted for the first sign of the original series. The disk 3 and the drum 2 are thereupon turned until that of the signs of the disk 3, which corresponds to the second sign of the original series comes into alinement with the field of observation and then the part 32 is again moved once forward and backward. The band is thereby again moved one step in one direction or the other so that another one of the openings 17 of the band uncovers a sign of the drum 2 within the field of observation. This sign is then substituted for the second sign of the original series.

The same operations are repeated for each sign of the original series.

Which of the signs in a longitudinal row of the drum that will be visibile through an opening 17 in the band 16, falling within the field of observation, will, as is easily conceived, depend upon two factors, viz: 1, the accidental position of this opening on the band, and 2, the direction of movement of the band, determined by the chain 19. The arrangement of the openings 17 in the band as well as of the different links of the chain 19 may represent arbitrarily chosen series of figures, for instance, as regards the chain, by letting the odd figures of any number, say of 831452, determine the number of flat links without knobs following one another, and the even figures of the same number, viz: 3, 4 and 2, determine the number of high links with knobs following one another, these numbers of flat and high links disposed alternatively within the chain. Evidently the substitution of other signs for those of the original series by means of the above apparatus will depend on the simultaneous influence of two series of signs. The combination and coöperation of these latter series being arbitrary, it is also evident that the signs of the resulting series substituted will be arbitrarily placed as compared to their respective places within the chosen standard series.

A combined influence of two or more mutation series may be obtained in the following way, reference being had to Figs. 1$^A$ and 2$^A$ which show a slight modification of the device illustrated in Figs. 1 and 2.

The reference characters used in the last-mentioned figures, are used in Figs. 1$^A$ and 2$^A$ to indicate the same or corresponding parts.

The lever 31 is as in Figs. 1 and 2 adapted to operate by means of the ratchet 30, the ratchet wheel 29 and the toothed wheel 28, which is rigidly connected with said ratchet wheel and meshes with the toothed wheel 27 loose on the shaft 1 and rigidly secured to the prism 18 serving to drive the chain 19, some links of which have protruding knobs 20. This chain actuates the lever 21 and thus the lever 24 rigidly connected to the lever 21 through the axle 22 which latter may be secured to the casing of the apparatus or any other stationary part thereof. The lever 24 is by means of a link 13$^a$ connected with one of two ratchets 30$^a$ and 30$^b$, rigidly connected to each other and journaled on an axle 30$^c$ fixed in the lever 31 and in a lever 31$^a$ forming together a fork which is journaled on the axle 33. For each of said ratchets 30$^a$ and 30$^b$ is provided a ratchet wheel 29$^a$ and 29$^b$ respectively, said ratchet wheels being loose on the axle 33 and rigidly secured to each other. The teeth of the wheels are turned in opposite directions and the ratchets are so arranged that they can never come simultaneously in gear with both ratchet wheels. Rigidly secured to the latter is a toothed wheel 28$^a$ which meshes with a toothed wheel 27$^a$ loose on the shaft 1 and serving to drive a chain 19$^a$, some of the links of which have protruding knobs 20$^a$. This chain actuates a lever 21$^a$ fixed to an axle 22$^a$, which is fixed in the arm 23 integral with the lever 14. Fixed to said axle 22$^a$ is another lever 24$^a$ which, by the link 13 is connected to one of the ratchets 9 and 10 operating the ratchet wheels 7 and 8 respectively in the manner described with reference to Figs. 1 and 2.

When the part 32 is moved once forward and backward as described above, the ratchet 30 will cause the chain 19 to be moved so as to engage by a new link the lever 21. According as this link is a flat one or one having a protruding knob 20 the ratchet 30$^b$ or 30$^a$ will engage the corresponding ratchet wheel 29$^b$ or 29$^a$, whereby the chain 19$^b$ by means of the parts 28$^a$, 27$^a$, and 18$^a$ will be moved so as to bring another link into engagement with the lever 21$^a$. According as this link is a flat one or one having a knob 20$^a$, the lever 24$^a$ will cause the ratchet 9 or 10 to engage the corresponding ratchet wheel 7 or 8, so that the band 16 will be moved one step in one direction or the other. The direction of movement of the band 16 thus depends upon the coöperation of the two chains, each representing an arbitrary series of figures or mutation series, and the uncovering of a sign on the drum 2 is thus determined by the coöperation or combined influence of three mutation series, represented by the two chains 19 and 19$^a$ and the band 16. It will now be easily understood that a combined influence of four mutation series or more will be reached only by increasing the number of chains.

The apparatus shown in Figs. 4 and 5 differs from that described above chiefly by several of the parts being in the shape of plane disks or disks with approximately plane surfaces, which renders the apparatus less spacious and in some regards facilitates the manipulation. A special advantage is, that some parts may be made out of transparent material, whereby a suitable arrangement of artificial light for reading off in the obscurity is facilitated. Moreover the part corresponding to the band 16 in Figs. 1 and 2 may be made out of stronger material and attached so as to be easily changed.

The part 37 in Figs. 4 and 5, a circular ring-shaped disk, suitably supported in a way permitting its rotation around its center, is at its outer circumference formed with teeth 39 of the form usual for stud-driven star-wheels ("Maltese cross"-shape); its inner circumference forming a common toothed gear 38. This disk 37 in some suitable way supports another ring-shaped disk 40, the rotation of either disk being independent of that of the other one. The outer circumference of the disk 40 is formed into teeth 41 being in gear with a toothed wheel 43, arbitrarily movable by a crank 42, by which means the disk 40 may be turned as desired.

The upper surface of disk 40 is marked with all signs composing the standard series chosen, (in the present case an alphabet), arranged in radial rows. The number of radial rows is the same as the number of signs of the standard series, each row containing an arbitrary number of signs, for instance 10, the signs of each row being, alphabetically, advanced one step as compared to those of the next row, which causes the outmost signs of all rows to form a circle containing all the signs, following one another in the order of the standard series chosen, an arrangement, the purpose of which will be shown to correspond exactly to that of the signs on disk 3 in Figs. 2 and 3. The disk 37 by means of its teeth 38 is in gear with a changeable toothed wheel 45, revolving around an axle 44 and to which is fixed a disk 46. In this last-mentioned disk a number of openings 47 are arranged in different distances from the center 44. The size of these openings corresponds to the space occupied by each sign in the radial rows on disk 40, and moreover the disposition of the apertures is such, as always to bring one of them exactly in line with the centers of the disks 40 and 46. Whenever disk 37 is turned in either direction at an angle corresponding to one tooth 39, the straight line through the center marks the field of observation underneath an aperture in the cover of the apparatus, through which the result is read off. Thus one of the signs in a certain row on disk 40, occasionally placed on this line will be visible through an opening 47 in the disk 46.

The intermittent rotation of the disks 37 and 46 is effectuated by means of two stud-wheels 48, 49, the studs 50 and 51 of which may alternatively be brought into gear with the teeth 39 of the disk 37, segments 52 and 53 in the usual way serving to keep the star-wheel 39 in rest when both studs are out of gear. Each stud-wheel is sliding on and forced to revolve together with its axle 54 and 55 respectively, an arrangement which may be carried out in different well known ways. The axles 54 and 55 are perpendicularly disposed relatively to the plane of the disks 37 and 46. The naves of the stud-wheels have annular grooves 56 and 57 respectively Fig. 5, into which grooves each end of a double-armed lever 59, with its center of movement at 58, is entering. Consequently when one of the stud-wheels slides upward along its axle, the other one slides downward. On the axle 54 a toothed wheel 60 is fixed, in gear with another such wheel 61 on the axle 55, this latter axle also carrying a toothed wheel 62 in gear with a wheel 63 on an axle 64. To the toothed wheel 63 is fixed a prism 65 (Fig. 4) which serves to drive a chain 66 guided by some suitable means. Some of the links of this chain have protruding segments 67 (Fig. 5), destined to lift a disk 68, fixed to the nave of the stud wheel 49, and consequently to put this stud-wheel into gear with the disk 37. Simultaneously the stud wheel 48 will get out of gear, sliding downward and compressing a screw spring 69 around the axle 54. When, on the other hand, a segment link 67 of the chain, driven around by the prism 65, is moved out of contact with disk 68, and is followed by a flat link, this will permit the screw spring 69 to push the stud-wheel 48 upward into gear with the disk 37 and simultaneously to put the stud-wheel 49 out of gear with the same disk. The rotation of the stud-wheels may be effectuated for instance by turning a crank fixed on the axle 54 or 55.

The apparatus shown in Figs. 4 and 5 is used in the following manner for changing an original series into another series of signs, the individual signs of which are arbitrarily disposed as compared to their positions within a standard series.

First the disk 40 is brought into the position required by means of the crank 42 and gear 43, placing the radial row of signs, the first sign of which, nearest to the circumference, corresponds to the casual sign of the original series to be changed, on the line of observation. In the present example (Fig. 4) the sign in question is $a$. Then the axle 54 or 55 is turned exactly one revolution which causes the disk 37 to move the length of one tooth in the one or the other direction, according as the one or the other of two stud-wheels 48 and 49 is in gear with the said disk, this finally depending on whether the disk 68, sliding on its axle 55, is lifted by one of the segment links of the chain 66 or not. When the disk 46 is turned one tooth, the gears 38 and 45 will cause the disk 46 to turn part of a revolution and place one of the openings 47 on the line of observation, thus uncovering one sign in the underlying row of signs on the disk 40, in the present example the letter $d$, which is then substituted for the original letter $a$. The same manipulations are repeated for every succeeding letter.

In every special case, the substituted letter resulting, will, according to the above description of the apparatus, shown in Figs. 4 and 5, be the result of two coöperating factors, exactly as is the case when using the apparatus shown in Figs. 1–3, viz: 1, the disposition of the openings 47 in the disk 46 and 2, the order in which segment links and flat links follow one another in the chain 66. Both these factors may represent an arbitrarily chosen series of figures, consequently the resulting series of signs, substituted for the original one, will be composed of signs quite arbitrarily disposed, as compared to their positions within the standard series chosen.

Figs. 6 and 7 show an apparatus, by means of which the change of a given series of signs is effectuated by using the very same series itself as one of the series determining the change.

On a main axle 70 a cylinder 71 is fixed, on which signs are marked with the same disposition as on the drum 2 in Figs. 1–3.

On the same axle a star-wheel 72 with teeth approaching the form of a Maltese cross is arranged in such a way, that it may slide along, but not rotate independently of its axle. Two stud-wheels 73 and 74 are placed on axles 75 and 76 respectively in a way enabling the star-wheel 72 to come in gear with either of them. The axle 75 carries a toothed wheel 77, in gear with another toothed wheel 78 of the same size, fixed on the axle 76. The wheel 78 further gears with a wheel 79 of double its size, the latter wheel revolving independently of its axle 80 and carrying a ratchet 81. A spring 82 presses this ratchet against a ratchet wheel 84 having two diametrically opposed teeth 83 (Fig. 7) for catching the ratchet 81. On the axle 80 a toothed wheel 85 is also fixed, gearing with a toothed segment 86, formed on one end of a doublearmed lever 87, which may swing about the main axle 70, the other arm of the lever being curved in U-shape running alongside the cylinder 71 (Fig. 6) to the other extremity of the lever the main axle passing through it. The lever 87 has a spring 88, keeping the lever, when the apparatus is not worked, in the position marked by full lines in Fig. 7. If swinging into the position shown by dotted lines in Fig. 7, the lever will by means of the segment 86, turn the wheel 85 as well as the axle 80 exactly half a revolution, the ratchet wheel 84 catching the ratchet 81, thus taking the wheel 79 around half a revolution, whereby the gears 78 and 77 will be driven exactly one revolution. This will cause the star-wheel 72 to be turned one tooth in either direction, depending upon its position on the axle 70, i. e. its being in gear with the one or the other of the stud-wheels 73 and 74. When brought back by the spring 88 to the position shown by full lines in Fig. 7, the part 87 will turn the axle 80 half a revolution in the opposite direction, and, the ratchet 81 sliding on the circumference of the wheel 84 without catching its teeth the wheels 79, 78 and 77 will remain in their positions.

The sliding motion of the star-wheel 72 along its axle 70 is accomplished by means of an annular groove 89 in the nave of the wheel (Fig. 6), engaged by a guiding fork 90, swingable on an axle 91. On this axle one end of another lever 92 is fixed, the other end of which carries a roller 93 in contact with the links of a chain 94. This chain is of the same construction and its links have approximately the same shape as described in connection with the chains 19 and 66 (Figs. 1–5), some links carrying protruding segments 95, and both kinds of links being alternatively disposed in a way to represent an arbitrarily chosen series of figures, the resulting effect of the chain 94 being also exactly the same as mentioned regarding the chains 19 and 66. A prism 96, fixed on an axle 97, drives the chain, this axle 97 also carrying a fixed toothed wheel 98 in gear with a toothed wheel 99, of half the size of the former one, and fixed on an axle 100. This axle by means of a bevel gear 101, 102 may be driven from the axle 80. To the bevel gear wheel 102 is fixed an arm or sector 103, both parts revolving independently of the axle 80, the sector 103 carrying a ratchet 104 and a spring 105 pressing the ratchet against a ratchet wheel 106, fixed on the axle 80 and having two diametrically opposed teeth 107 (Fig. 7) for catching the ratchet. These teeth are facing the opposite direction compared to those mentioned in connection with the wheel 84 (Fig. 7). When the sector end of part 87 swings upward, the other end being pressed down, the ratchet 104 consequently will slide on the circumference of the wheel 106 without catching its teeth, thus leaving the wheel 102 and the chain-mechanisms in their positions. When part 87 is swung back by the spring 88, the sector 86 going down, the wheel 102 will be moved by means of its arm or sector 103, the ratchet 104 and the wheel 106, thus causing the gear 101, 99, 98 to turn the prism 96 the fourth part of a revolution and bring a new link of the chain in contact with the roller 93. Supposing this link to carry a segment 95, parts 92, 91, 90 will be brought into the position shown in Fig. 6, compelling the star-wheel 72 to slide into gear with the stud-wheel 73, thus compressing a spring 108 (Fig. 6) placed on the axle 70 between the star-wheel and the cylinder 71. If, at the next movement of the prism, a link with a segment is followed by one without a segment, the spring 108 will force the star-wheel 72 out of gear with the stud-wheel 73 and into gear with the other one 74. Thus the direction of the movement of both star-wheel and cylinder is determined by the chain 94.

The working of part 87 is obtained by pressing down keys or touches 109, each of which is marked with one sign out of the standard series used in the rows of signs on the drum 71. The touches are guided by fixed parts 110, 111, and kept in their highest positions by springs 112. To the touches are fixed fingers 113, each of which is reaching out over the part 87 and through an opening in a small screen 114. These screens are kept in position by a guiding part 115, running alongside the drum 71. They are circularly curved, thus permitting them to slide along a circle somewhat bigger than the circumference of the cylinder. When kept in the position shown by full lines in Fig. 7, these screens cover an aperture 116 (Fig. 7) in the cover of the apparatus, corresponding to one longitudinal row of signs on the drum 71.

The apparatus shown in Figs. 6 and 7 is used in the following way. One of the touches, marked with the sign to be changed into another one, is pressed down. This causes the cylinder 71 to turn one step in the one or the other direction and to show one sign in the space left uncovered by the one screen 114, which slides down together with the key pressed. This sign uncovered is marked instead of the one in the button on the key, which latter is released. The spring 88 then influencing the part 87, a new link of the chain 94 will be brought forward and determine the direction of the movement of the cylinder, next time a button is pressed, carrying the second sign in the original series. A new sign will show in the unscreened place of the drum and so forth.

Evidently the series of signs resulting and substituted for the original one will be quite arbitrary as regards the order of the signs compared to their order within a standard series. It is also evident, that this arbitrary result will depend on two mutation series viz: 1, the original series of signs, being itself arbitrarily chosen, and 2, the arbitrary arrangement of the links of the chain 94.

Figs. 8–11 show another apparatus also utilizing the original series of signs as one of the mutation series. Instead of being marked on the buttons of a key-board as in Figs. 6 and 7, the signs of a standard series are marked on a ruler 118, sliding in the upper part of the cover 117 of the apparatus, and having at one end an opening 119, being at the other end provided with a suitable handle 120. A string or band 122 is attached to an arm 121 fixed to one end of the ruler and led over a roller 124 to another roller 123, around which it is wound several turns and to which the end of the string is fastened. To this roller 123 a clutch-coupling 125 is joined, by means of which a corresponding clutch secured to a toothed wheel 127, may be turned in one direction independently of its axle 126. This wheel 127 gears with another toothed wheel 129 fixed on an axle 128. The clutch coupling is kept in gear by a screw-spring 159 on the axle 126. The dimensions of the toothed wheels 127, 129 and of the roller 123 are chosen so as to cause the wheel 129 to be turned exactly one revolution, when the ruler 118 is made to slide (to the left on the drawing) from the position shown in Figs. 8 and 10 till its last sign (to the right) comes exactly under a pointer 130 fixed to the upper part of the cover 117.

In order to wind up the string 122 again around the roller 123, a spiral spring 131 (or any similar contrivance) is attached to the roller, the spring being wound up, when the string is wound off, and vice versa. A stud-wheel 132, which may slide on its axle, may be turned by this axle 128. Bevel gears 133, 134, 135 transmit this movement to another axle 136, turning in the opposite direction. Another stud-wheel 137 is slidingly arranged on this latter axle 136 together with which it will revolve, these two stud-wheels being destined alternatively to come into gear with the one or the other of two star-wheels 139 and 140 fixed to each extremity of a prism 138, and thus alternatively to turn this prism in opposite directions. The prism 138 drives an endless sheet 142, also led around four conducting prisms 141 as shown in Fig. 9. The sheet is marked with the same signs as the ruler 118, disposed exactly in the same way as on the cylinders 2 (compare Figs. 1 and 2) or 71 (Figs. 6 and 7). The sheet 142 is conducted closely under the ruler 118, thus permitting the signs on the sheet easily to be read through the aperture 119 in the ruler. The length of the sheet, determined by the dimensions of the prism 138 and the number of transversal rows of signs, is such, that a new row will be brought just under the ruler, each time the prism is turned an angle corresponding to one tooth of the star-wheels 139, 140. The alternative coming into gear of these wheels with the stud-wheels 132, 137 is regulated by a chain 145, constructed in the same way as the chains 19, 66 and 94, already described. A couple of prisms 143 and 144 serve to drive and guide the chain, the former one being fixed to a toothed wheel 147 receiving its motion from a four times smaller wheel 149 on the same axle 148 as the conical wheel 134. The chain 145 influences a roller 150, carried by a sliding part 151, this part serving to keep the stud-wheel 137 in the required position by means of its forked end which engages an annular groove 152 in the nave of the wheel and is connected by a rod 153 with another sliding part 154, equally engaging with its forked end a corresponding groove 155 in the nave of the other stud-wheel 132.

When a link of the chain with a segment 156 (Fig. 11) comes into contact with the roller 150, the sliding part 151 and the stud-wheels 137, 132 are pushed to the left in Fig. 8, the stud-wheel 137 coming out of gear with the star-wheel 140 and the stud-wheel 132 into gear with the star-wheel 139. When the segment link moves out of contact with the roller 150 and is followed by a flat link, a screw spring 160, placed on the rod 153, between the sliding part 154 and any fixed part (for instance, as in Fig. 8, the bearing 161 of the bevel gears 133—135) will push the sliding parts 151, 154 together with the stud-wheels 137, 132 back into the position shown in Fig. 8.

On the axle 128 carrying the wheel 129 a catch-wheel 157 is fixed, which, in connection with a spring catch 158 will act as a brake to prevent the wheels 127, 129 from turning, when the string 122 is wound up on the roller 123 by the spiral spring 131.

The apparatus shown in Figs. 8–11 is used in the following way. First the ruler 118 is drawn out (to the left on the drawings) till its last sign comes just under the pointer 130, which causes the roller 123 to turn the axles 128, 136, by means of the clutch-arrangement 125 and the wheels 127, 129, exactly one revolution, that one of stud-wheels 132 and 137, which may occasionally be in gear, turning one of the star-wheels 139, 140 and the prism 138 one step in the one or the other direction, thus bringing a new row of signs on the sheet 142 just underneath the ruler 118. The ruler is then pushed back so far as to bring one of its signs corresponding to the sign of the original series which is to be changed, just under the pointer 130. The sign then visible through the aperture 119 in the ruler is written down instead of the one of the original series. The ruler is then completely pushed back (as shown in Fig. 10) and the same manipulations are repeated for each following sign in the series to be changed.

The substitution of one sign for another by means of this apparatus will evidently also be the result of two mutation series working together, viz: 1, the arbitrary series of figures represented by the chain 145 and 2, the original series determining the different successive positions of the ruler 118 when reading off the result.

In order to make the apparatus shown in Figs. 8–11 as small as possible, it is advantageous to make use of the endless sheet 142, arranged as described, but evidently a cylinder, marked with signs according to Figs. 3 or 6, or a disk, marked with signs according to Fig. 4, may be substituted for the endless sheet.

Having now described my invention, what I claim as new and desire to secure by Letters Patent is:

1. In a device or apparatus for changing a series of signs of any length into another series of signs, the individual signs of which are arbitrarily displaced as compared to their positions within a chosen standard series, the combination of a sign supporting member adapted to be adjusted successively according to the successive signs of the original series, a second member coöperating with the first mentioned member to determine the signs to be substituted for the signs of the original series, and means for moving the said second member alternatively in either direction in accordance with a series of mutation, substantially as and for the purpose set forth.

2. In a device or apparatus for changing a series of signs of any length into another series of signs, the individual signs of which are arbitrarily displaced as compared to their positions within a chosen standard series, the combination of a sign supporting member adapted to be adjusted successively according to the successive signs of the original series, a second member movable stepwise in both directions and carrying in rows of signs advancing one step from row to row the signs of the standard series of signs chosen, and means for moving the said second member alternatively in either direction in accordance with a series of mutation, substantially as and for the purpose set forth.

3. In a device or apparatus for changing a series of signs of any length into another series of signs, the individual signs of which are arbitrarily displaced as compared to their positions within a chosen standard series, the combination of a member carrying one set of the signs of the standard series chosen and adapted to be adjusted successively according to the signs of the original series of signs, a second member movable stepwise in both directions and carrying in rows of signs advancing one step from row to row the signs of the standard series chosen, a driving device for the said second member capable of acting in both directions, and a third member representing a series of mutation and serving to control the direction of action of the said driving device, substantially as and for the purpose set forth.

4. In a device or apparatus for changing a series of signs of any length into another series of signs, the individual signs of which are arbitrarily displaced as compared to their positions within a chosen standard series, the combination of a member carrying one set of the signs of the standard series chosen and adapted to be adjusted successively according to the signs of the original series of signs, a second member movable stepwise in both directions and carrying in rows of signs advancing one step from row to row the signs of the standard series chosen, a driving device for the said second member capable of acting in both directions, a third member representing a series of mutation and serving to control the direction of action of the said driving device, and means operatively connecting the said driving device with the first mentioned sign carrying member, substantially as and for the purpose set forth.

5. In a device or apparatus for changing a series of signs of any length into another series of signs, the individual signs of which are arbitrarily displaced as compared to their positions within a chosen standard series, the combination of two sign carrying members coöperating with each other to give successively the signs to be substituted for the signs of the original series, one of said members serving as a series of mutation, with a third member representing a series of mutation and serving to control the coöperation of the two first mentioned members, substantially as and for the purpose set forth.

In testimony whereof I have signed my name in presence of two subscribing witnesses.

ARVID GERHARD DAMM.

Witnesses:
ANN DELMAR,
JOHN DELMAR.